United States Patent [19]
Åsbrink

[11] Patent Number: 5,883,574
[45] Date of Patent: Mar. 16, 1999

[54] ARRANGEMENT FOR PREVENTING DISTURBANCES IN ELECTRONIC ALARM SYSTEMS

[76] Inventor: Leif Åsbrink, Jäders Prästgård 3265, S-635 05 Eskilstuna, Sweden

[21] Appl. No.: 737,730

[22] PCT Filed: May 16, 1995

[86] PCT No.: PCT/SE95/00548

§ 371 Date: Nov. 15, 1996

§ 102(e) Date: Nov. 15, 1996

[87] PCT Pub. No.: WO95/31862

PCT Pub. Date: Nov. 23, 1995

[30] Foreign Application Priority Data

May 16, 1994 [SE] Sweden ................................ 9401676-3

[51] Int. Cl.$^6$ .................................................. G08B 13/14
[52] U.S. Cl. ............................ 340/572; 340/552; 340/511
[58] Field of Search .................................... 340/572, 511, 340/825.63, 552

[56] References Cited

U.S. PATENT DOCUMENTS

| | | | |
|---|---|---|---|
| 3,810,147 | 5/1974 | Lichtblau | 340/280 |
| 4,326,198 | 4/1982 | Novikoff | 340/572 |
| 4,598,276 | 7/1986 | Tait | 340/552 |
| 4,751,500 | 6/1988 | Minasy et al. | 340/572 |
| 5,103,209 | 4/1992 | Lizzi et al. | 340/572 |
| 5,111,186 | 5/1992 | Narlow et al. | 340/572 |
| 5,285,191 | 2/1994 | Reeb | 340/572 |
| 5,309,147 | 5/1994 | Lee et al. | 340/511 |

FOREIGN PATENT DOCUMENTS 0153286  8/1985  European Pat. Off. .
WO8808181 10/1988  WIPO .

*Primary Examiner*—Jeffery A. Hofsass
*Assistant Examiner*—John Tweel, Jr.
*Attorney, Agent, or Firm*—Alfred J. Mangels

[57] ABSTRACT

An arrangement for preventing disturbances in electronic alarm systems of the kind used in merchandise security systems. The alarm system includes an alarm element which is adapted to receive a magnetic alternating field transmitted by a transmitter, and also to retransmit a magnetic alternating field. A receiver is adapted to receive and detect the the retransmitted alternating field. An LC resonance circuit is located in at least certain pairs of electric conductors (5; 12, 13; 20, 21; 25, 26) in the alarm system between the system electronics (2; 16) and a receiver coil (1; 24), and alternatively also a transmitter coil (14). The resonance circuit is tuned to the working frequency or frequencies of the system to produce a high impedance on the conductor pair for current directed in the same direction in the conductors, thereby heavily dampening disturbance sources coupled capacitively, inductively, or resistively to the alarm system.

14 Claims, 2 Drawing Sheets

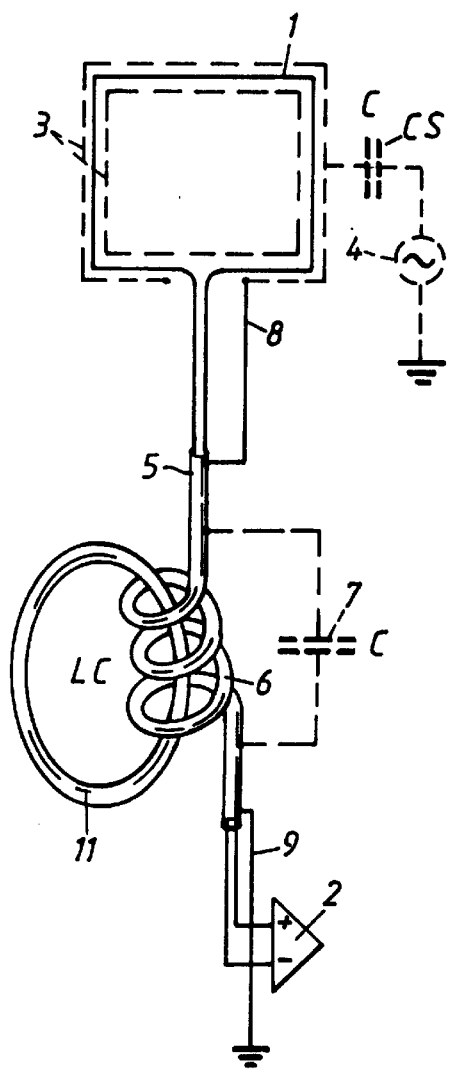
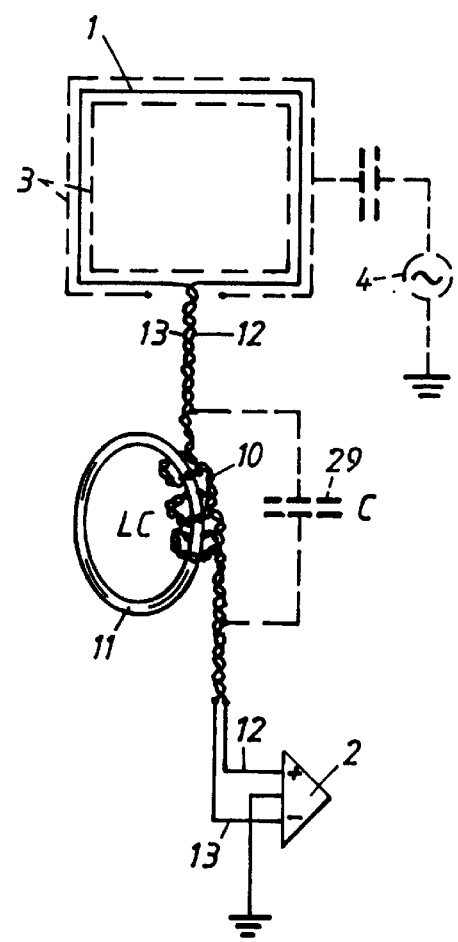

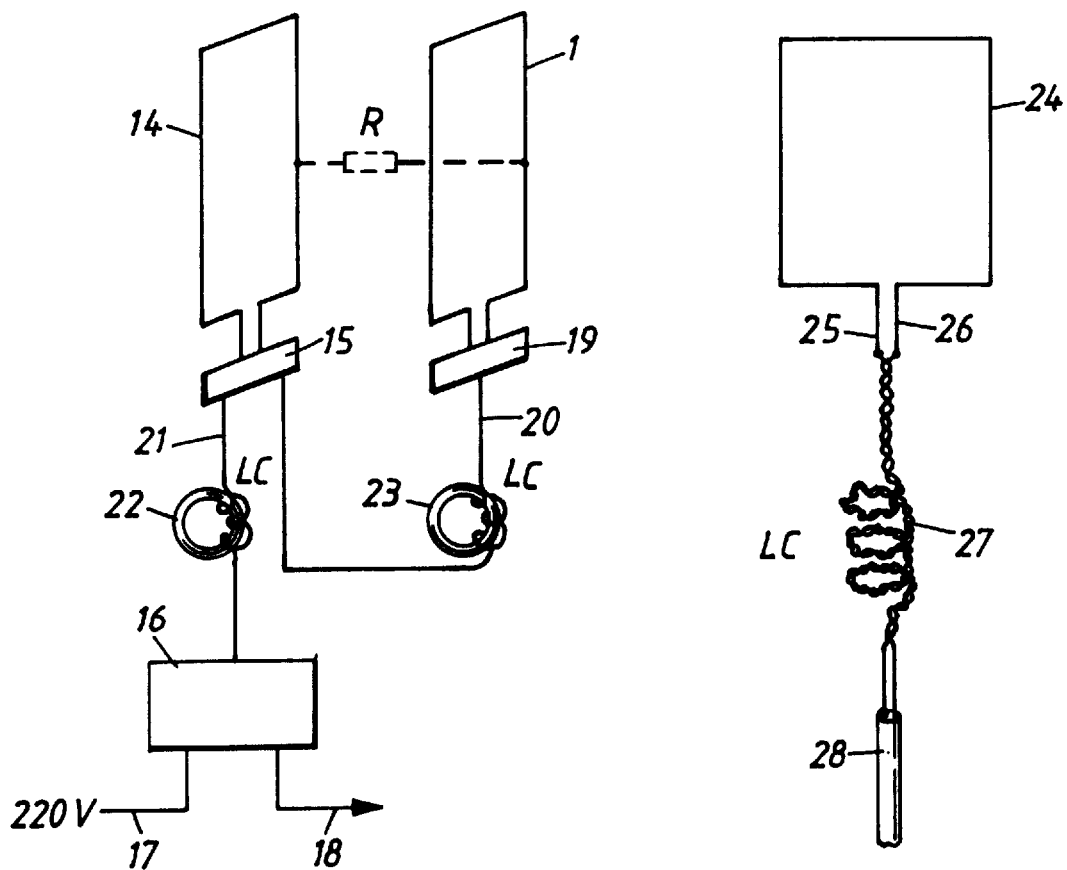

ARRANGEMENT FOR PREVENTING DISTURBANCES IN ELECTRONIC ALARM SYSTEMS

BACKGROUND OF THE INVENTION

The present invention relates to an arrangement for preventing disturbances in electronic alarm systems of the kind used in merchandise security systems.

DESCRIPTION OF THE RELATED ART

Many different types of merchandise security alarm systems are described in the patent literature. These arrangements are intended to prevent merchandise from being removed from shops and stores without having been paid for. Normally, such merchandise security arrangements, or theft prevention systems, include some type of alarm element which is secured to the merchandise to be protected, and a detector device which is installed in the vicinity of the store exit and which delivers an alarm through the medium of remote detection control when an alarm element is brought into the vicinity of the store exit.

Remote detection of the alarm element is normally achieved by transmitting a magnetic alternating field, wherewith the presence of an alarm element can be detected through a change in the alternating field characteristic of the alarm element.

The alarm element may have the form of an elongated, narrow thin strip of highly permeable material whose characteristic property is to transmit high order harmonics when subjected to the effect of a magnetic alternating field. This known basic principle enables small and inexpensive alarm elements to be detected with the aid of complicated and relatively expensive detection systems. This type of merchandise alarm is particularly well-suited for protecting everyday commodities or merchandise and is described, inter alia, in European Patent Specification EP 0,153,286.

Also known to the art are alarm elements comprised of a simple electric resonance circuit. In this case, the detection system can be made simple and inexpensive when the coil in the resonance circuit is relatively large, so that a good Q-value can be readily obtained at the same time as the coupling to external fields will be large. In this case, the coil is mounted in an alarm plate which is secured to the merchandise to be protected with the aid of some suitable fastener means. As before mentioned, the detection systems which operate with this type of alarm can be made relatively uncomplicated at a relatively low cost, although it is difficult to avoid the problem of triggering false alarms, because the store environment will often include loops of conductive material which give rise to resonances similar to the resonances obtained from the alarm elements.

Another problem resides in coupling of current in the receiver and transmitter coils and current on the alarm system cables that extend between the transmitter and receiver equipment and the detection system. By current on conductors is meant that a net current flows in a pair of conductors between which an alternating voltage prevails, i.e. the current in one conductor of the conductor pair is greater than the current in the other conductor of said pair. Cable current means that the sum of the currents in all conductors of the cable differ from zero, when taking into account the direction of the current in each conductor.

By pairs of conductors is meant above and below, and also in the Claims, a pair which consists in two simple conductors and a cable including two or more conductors, of which one or more conductors can be comprised of a shield around one or more other conductors.

When the transmitter gives rise to a current on conductors other than those conductors which form the actual coil, an alarm can be triggered by an alarm element that is in the close vicinity of a conductor but far away from the coil itself. This is most undesirable.

Current on conductors other than those which form the receiver coil can give rise to a signal in the receiver as a result of the receiver taking in disturbances that originate from electromagnetic fields that couple to the conductor concerned, for instance as a result of the conductor passing an electrical apparatus.

If a transmitter coil or a receiver coil is touched by a person, and in particular if both coils are touched at the same time, marked signal variations will occur in the receiver. This can give rise to a false alarm and also reduce the detection efficiency of the system.

A known solution which reduces, but does not eliminate, the problems of coupling between different disturbance sources and the system is to balance transmitter and receiver to earth and to balance and screen the coils. This solution is described in Swedish Patent Specification SE 445,498.

SUMMARY OF THE INVENTION

The present invention eliminates the problems of coupling between different units in the system and coupling between the system and external disturbance sources of different kinds.

The present invention thus relates to an arrangement for preventing disturbances in electronic alarm systems of the kind used in merchandise security systems. The system includes an alarm element which is adapted to receive a magnetic alternating field transmitted from a transmitter and to retransmit a magnetic alternating field. A receiver is adapted to receive and detect the retransmitted alternating field. In at least given pairs of electric conductors in the system between the electronics and the receiver coil of said system, and alternatively also the transmitter coil of said system there is provided a resonance circuit which is tuned to the working frequency or working frequencies of the system such as to produce a high impedance on the pair of conductors for current wherein the impedance directed in the same direction in said conductors and thereby markedly dampens disturbance sources that are coupled capacitively, inductively or resistively to the system.

BRIEF DESCRIPTION OF THE DRAWING

The invention will now be described in more detail with reference to exemplifying embodiments thereof and also with reference to the accompanying drawings, in which FIG. 1 illustrates a first embodiment of the invention;

FIG. 2 illustrates a second embodiment of the invention;

FIG. 3 illustrates the use of the invention in a manner different to that shown in FIG. 1 or FIG. 2; and FIG. 4 illustrates a third embodiment of the invention.

DESCRIPTION OF THE PREFERRED EMBODIMENTS

The present invention relates to an arrangement for preventing disturbances in electronic alarm systems of the kind used in merchandise security systems, such systems include an alarm element which is adapted to receive a magnetic alternating field transmitted by a transmitter and also to retransmit a magnetic alternating field, wherein a receiver is adapted to receive and detect the retransmitted alternating field.

In order to illustrate the problem that exists with known systems, reference is made to FIG. 1, which shows a receiver coil 1. Also shown in the Figure is a receiver of a front-end circuit in the present type of alarm system, namely a differential amplifier 2. It is assumed that receiver coil 1 is screened with a screen or shield 3 and that a two-conductor screened transmission conductor extends between the receiver coil 1 and the receiver or different amplifier 2. In the known technique this conductor is not wound in the form of a coil as shown in FIG. 1.

When an alarm element (not shown) is located in an investigation zone in which the receiver coil 1 is located, the magnetic alternating field transmitted by the alarm element will induce an electromotive force (EMF) in the receiver coil 1. This EMF is sensed by the receiver 2.

One problem is that the receiver coils of existing systems are subjected to electrical disturbances which are coupled capacitively to the receiver coil. This is illustrated in FIG. 1 in broken lines. A disturbance source in the locality is referenced 4 and in the illustrated case has the form of an oscillator. This disturbance source is coupled capacitively to the sheild 3 of the receiver coil 1. This capacitive coupling is illustrated by a capacitor capacitance CS that prevails between the disturbance source 4 and the receiver coil 1. The current that arises in the shield 3 as a result of the capacitive coupling CS gives rise to a voltage on the receiver input through transformer output. This may cause the receiver 2 to understand the signal as originating from an alarm element and to trigger an alarm.

The current originating from the disturbance source 4 flows on the shield 3, clockwise on the shield 3, through the conductor 8, on the conductor 5 associated with the shield, and through the conductor 9 to earth. This current induces in the coil 1 an electromotive force which gives rise to a voltage difference between the positive terminal and the negative terminal of the reciever or amplifier 2.

This problem and other corresponding problems are solved in accordance with the invention in that at least given pairs of electric conductors in the system, between the electronics and the receiver coil 1 of the system, and alternatively also the transmitter coil, there is provided a resonance circuit which is tuned to the working frequency or working frequencies of the system so as to produce a high impedance in the conductor pair for current directed in the same direction in said conductors, thereby markedly dampening disturbance sources that are coupled capacitively in the system.

This results in a very high net current impedance, i.e. when the sum of the currents in the two conductors differ from zero while taking into account the direction of the currents. However, the impedance of such a resonance circuit will be small when the net current is equal to zero, i.e. when the front-end circuit 2 has a low impedance the current passing through the receiver coil 1 and the front end circuit will not be influenced by the resonance circuit.

When a cable containing two or more conductors is to be connected to a resonance circuit in accordance with the invention, the whole of the cable is wound to a coil form.

When an alarm element is detected, the two-conductor cable will ideally receive a zero net current. On the other hand, the net current differs from zero when current flow originates from the capacitive coupling.

According to one preferred embodiment of the invention, the resonance circuit is formed by winding the pair of conductors 5 concerned to provide a coil 6 of inductance L, and forming the capacitance in the resonance circuit from the stray capacitances C between the conductors in said coil, and optionally other stray capacitances. The stray capacitance is illustrated by a capacitor 7 shown in broken lines.

According to a first embodiment of the invention, the pair of conductors extend from the receiver coil 1, and alternatively also to the transmitter coil, in the form of solely one shielded two-conductor cable 5 which is wound to form a coil of inductance L and includes the stray capacitance C. This embodiment is illustrated in FIG. 1.

Thus, according to this embodiment, the receiver coil 1 is connected to a shielded two-conductor cable 5 which is wound to form a coil having the inductance L and including the stray capacitance C. The shield of the two-conductor cable can be connected to the shield 3 of the receiver coil 1 through conductor 8, and also to the differential amplifier 2 and to earth through conductor 8 and 9.

When the capacitance CS is essentially equal to the stray capacitance C, the impedance across the resonance circuit LC will be in the order of ten times the impedance across the capacitance CS. The bandwidth is then approximately ±/−10%. This means that the disturbing current originating from the disturbance source will be reduced by a factor of 10, whereby disturbance sensitivity will be reduced to the same extent. On the other hand, current originating from an alarm element will not be dampened to any appreciable extent. Higher damping effects can be obtained with narrower bandwidths.

According to one embodiment of the invention, a capacitor 30 is connected in parallel across each two-conductor shield, with respective connecting points located on respective sides of the coil, i.e. in the manner in which the broken-line capacitor 7 of FIG. 1 is connected. Thus, in this case, the total capacitance is comprised of the capacitor 30 capacitance and the stray capacitance represented by capacitor 7.

The parallel coupling of a capacitor 7 across the coil 6 affords the advantage of requiring a fewer number of coil turns to achieve the same damping effect on net currents, although it has a drawback in the form of reduced bandwidths.

Two or more different working frequencies occur in some systems of the present kind. A large bandwidth is therefore sometimes an advantage. However, it may be necessary to include in such systems several series-connected resonance circuits coupled to the two-conductor cable. In these cases, each resonance circuit is a separate LC-circuit.

A single resonance circuit is sufficient in other systems having only one working frequency.

However, it is desirable for capacitance 7C to have the smallest possible capacitance, since the desired damping of net currents is hereby maximized. Because of this, the capacitance C is preferably comprised of the stray capacitance of the coil 6 and optionally other stray capacitances.

Since the resonance circuit effectively reduces the flow of net current through the conductors 8, 9 connected to the shield of the two-conductor cable, these conductors can be omitted.

Neither is it necessary to use a shielded two-conductor cable. The same effect is achieved with the use of a well-twisted, unshielded two-conductor cable.

According to one highly preferred embodiment of the invention, illustrated in FIG. 2, a pair of unshielded conductors 12, 13 extend from the receiver coil 1 and alternatively also to the transmitter coil, wherein the conductors are twisted around one another and in one twisted part are wound to form a coil 10 having the inductance L and including the stray capacitance C.

In the case of the embodiment, the stray capacitance may be essentially smaller than the capacitance CS, therewith providing highly effective damping of disturbances. In this case, the shield 3 around the receiver coil 1 may be removed to no great detriment, therewith reducing the cost of the receiver coil.

The second embodiment may also include a capacitor 29 which is connected in parallel across one of the two conductors of said conductor pair, with its connection point on respective sides of the coil, as illustrated in broken lines in FIG. 2.

According to one preferred variant of the two aforedescribed embodiments shown in FIGS. 1 and 2 respectively, the coil 6; 10 is wound around a ferrite core 11 so as to increase the inductance of the coil 6, 10.

When only disturbances external disturbance sources are to be dampened, it is sufficient to provide a resonance circuit between the receiver coil and the receiver. The resonance circuit therewith prevents conductor-carried disturbance signals from reaching the receiver coil via its capacitance to earth.

However, it is also desirable to provide the conductors from the transmitter to the transmitter coil with a resonance circuit. This will prevent the presence of an alarm element in the close proximity of these conductors, or in the close proximity of a system current supply conductor or in the close proximity of other conductors, from resulting in an alternating field in the system characteristic of the alarm element.

FIG. 3 illustrates a third embodiment of the invention which includes a receiver coil 1 and a transmitter coil 14. This exemplifying embodiment also includes adjacent the transmitter coil 14 an electric contact unit 15 for connection of an electronic unit 16 to the transmitter coil 14, via a conductor 21. The electronic unit 16 includes a voltage unit, oscillators for generating the magnetic alternating fields to be transmitted, a receiver for receiving an alternating field in the receiver coil, a microprocessor for processing a received signal, etc. The electronic unit is connected to mains voltage via a conductor 17 and is provided with an output 18 on which an alarm signal is delivered. An electric contact unit 19 for connecting conductors to the receiver coil 1 is also provided adjacent the receiver coil 1. The electrical contact unit may include certain electronic components. In the illustrated embodiment, a conductor 20 extends between the receiver coil contact unit 19 and the transmitter coil contact unit 15. The receiver coil is thus connected to the electronic unit 16 via the contact unit 15 of the transmitter coil. Each of the conductors 20, 21 may include a plurality of electric conductors, depending on the construction of the receiver coil among other things. The component referred to as a receiver coil may, in fact, consist in a plurality of different, mutually separated coils.

According to this embodiment of the invention, each of the conductors 20, 21 is wound to form a coil form around a ferrite core 22, 23, thereby to avoid net currents in the conductors. The conductors 20, 21 are either shielded or twisted in the aforesaid manner. In the case of this embodiment, the stray capacitances of the formed coils are used as capacitance C in the resonance circuits. In the case of this embodiment, it is important that the resonance circuits are placed so that the stray capacitances, which determine the resonance frequency, will not vary appreciably with normal variations in the positioning of the conductors 20, 21.

The inventive arrangement also prevents problems arising due to inductive coupling between receiver coil 1 or transmitter coil 14 in a set-up according to FIG. 3 and a conductor belonging to the alarm system.

Problems caused by resistively coupled disturbance sources are also prevented, such as when a person touches both coils 1; 14 simultaneously, which is illustrated in FIG. 3 with a resistor R.

FIG. 4 illustrates an inventive arrangement which is advantageous in practice and which includes a receiver coil or transmitter coil 24. The conductors leading to the coil 24 of the FIG. 4 embodiment are two twisted single-conductors 25, 26 which have been wound to form a conductor coil 27 along one twisted part thereof. The conductors 25, 26 are connected to a coaxial cable 28, with one of the conductors connected to the cable shield.

The sensitivity of the system, or system response, in indicating an alarm is such that net currents that have been dampened by means of the resonance circuit will have, subsequent to being dampened, an amplitude which is too low to have an unfavourable effect on the function of the system.

In this regard, the resonance circuit or circuits is/are configured to achieve sufficiently high damping of occurrent disturbances, i.e. net current, while the damping of a signal will be small when the net current is zero. The person skilled in this art will be quite capable of selecting the capacitance C and the inductance L of the resonance circuit to correspond to relevant working frequencies in each individual case.

It is therefore apparent that the problems described in the introduction are eliminated by means of the present invention.

What is claimed is:

1. An electronic alarm system, said system comprising: a transmitter coupled with a transmitter coil for transmitting an alternating magnetic field at a working frequency; a receiver coil coupled with a receiver for receiving alternating magnetic fields; an alarm element which is adapted to receive the alternating magnetic field transmitted by the transmitter and also to retransmit an alternating magnetic field, wherein the receiver is adapted to receive and detect the retransmitted alternating magnetic field; at least one resonance circuit tuned to the working frequency of the alarm system and including an LC resonance circuit which is separate from the receiver coil and separate from the receiver and is located in at least one pair of certain pairs of electric conductors in the alarm system between the receiver and the receiver coil, wherein the LC resonance circuit is tuned to the working frequency of the system to produce a high impedance on the conductor pair for current directed in the same direction in the conductors, to damp disturbance currents originating from disturbance sources coupled capacitively, inductively or resistively to the alarm system.

2. An alarm system according to claim 1, wherein the LC resonance circuit is defined by a conductor pair that is wound to form a resonance circuit coil having an inductance L; and in that the LC resonance circuit has a capacitance defined by the stray capacitances C between the conductors in the resonance circuit coil.

3. An alarm system according to claim 2, wherein the conductor pair extends from the receiver coil in the form of one shielded, two-conductor cable which is wound to form the resonance circuit coil having the inductance L and including the stray capacitance C.

4. An alarm system according to claim 2, wherein a conductor pair includes a pair of unshielded conductors that extend from the receiver coil, wherein the conductors of each pair of conductors are twisted around one another and, in a twisted part, are wound to form the resonance circuit coil having the inductance L and including the stray capacitance C.

5. An arrangement according to claim 2, wherein the resonance circuit coil is wound around a ferrite core.

6. An alarm system according to claim 3, wherein a capacitor is connected in parallel across the shield of the shielded two-conductor cable at respective capacitor connection points located at respective ends of the resonance circuit coil.

7. An alarm system according to claim 4, wherein a capacitor is connected in parallel across one of the conductors in each conductor pair at capacitor connection points located at respective ends of the resonance circuit coil.

8. An alarm system according to claim 1, including an LC resonance circuit which is separate from the transmitter coil and separate from the transmitter and is located in at least one pair of certain pairs of electric conductors in the alarm system and coupled with the transmitter coil.

9. An alarm system according to claim 3, including an LC resonance circuit which is separate from the transmitter coil and separate from the transmitter and is located in at least one pair of certain pairs of electric conductors in the alarm system and coupled with the transmitter coil.

10. An alarm system according to claim 2, wherein a conductor pair includes a pair of unshielded conductors that extend from the receiver coil, wherein the conductors of each pair of conductors are twisted around one another and, in a twisted part, are wound to form the resonance circuit coil having the inductance L and including the stray capacitance C.

11. An alarm system according to claim 3, wherein the resonance circuit coil is wound around a ferrite core.

12. An alarm system according to claim 4, wherein the resonance circuit coil is wound around a ferrite core.

13. An alarm system according to claim 5, wherein a capacitor is connected in parallel across the shield of the shielded two-conductor cable at respective capacitor connection points located at respective ends of the resonance circuit coil.

14. An alarm system according to claim 5, wherein a capacitor is connected in parallel across one of the conductors in each conductor pair at capacitor connection points located at respective ends of the resonance circuit coil.

* * * * *